Patented Oct. 21, 1924.

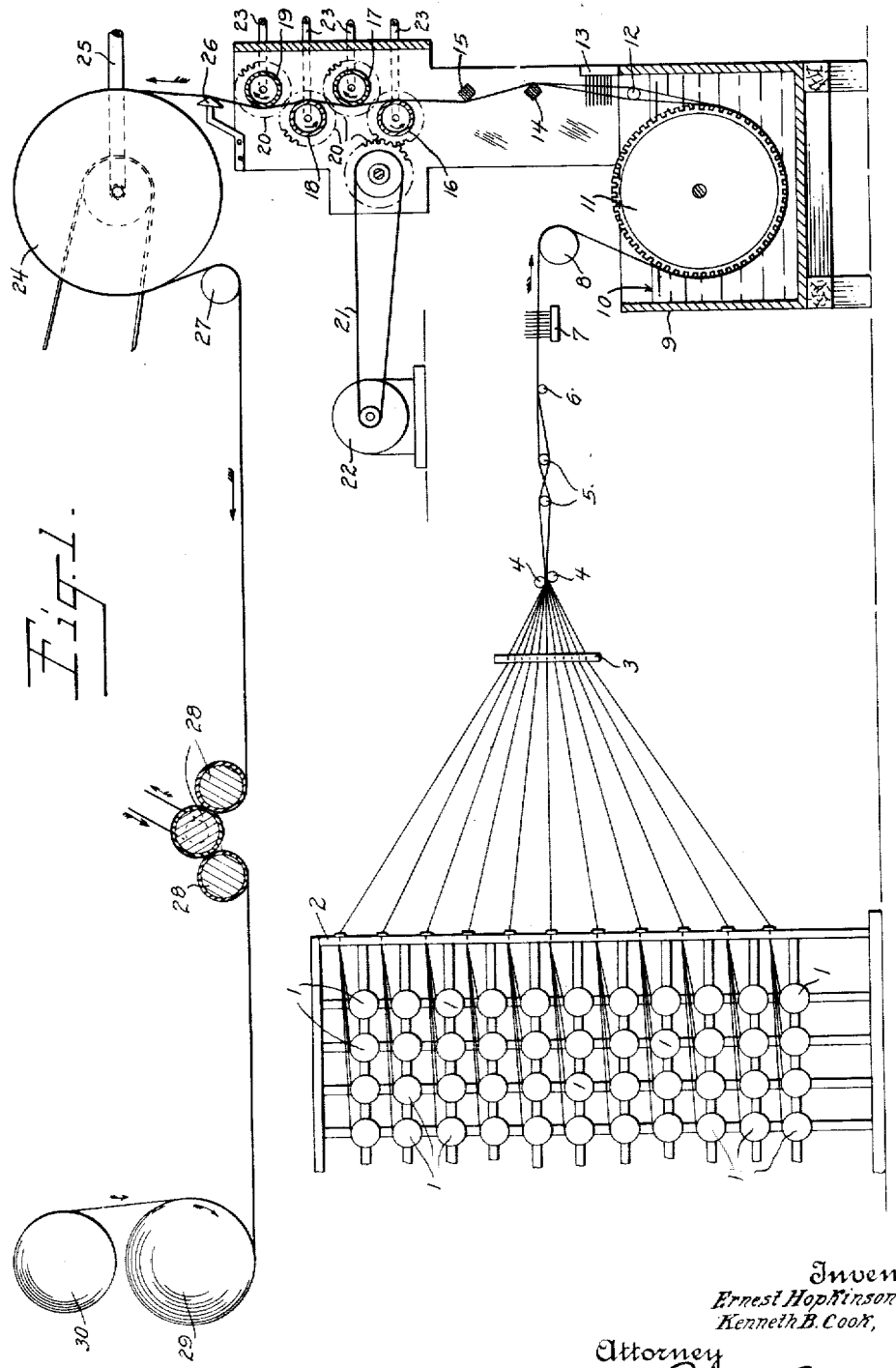

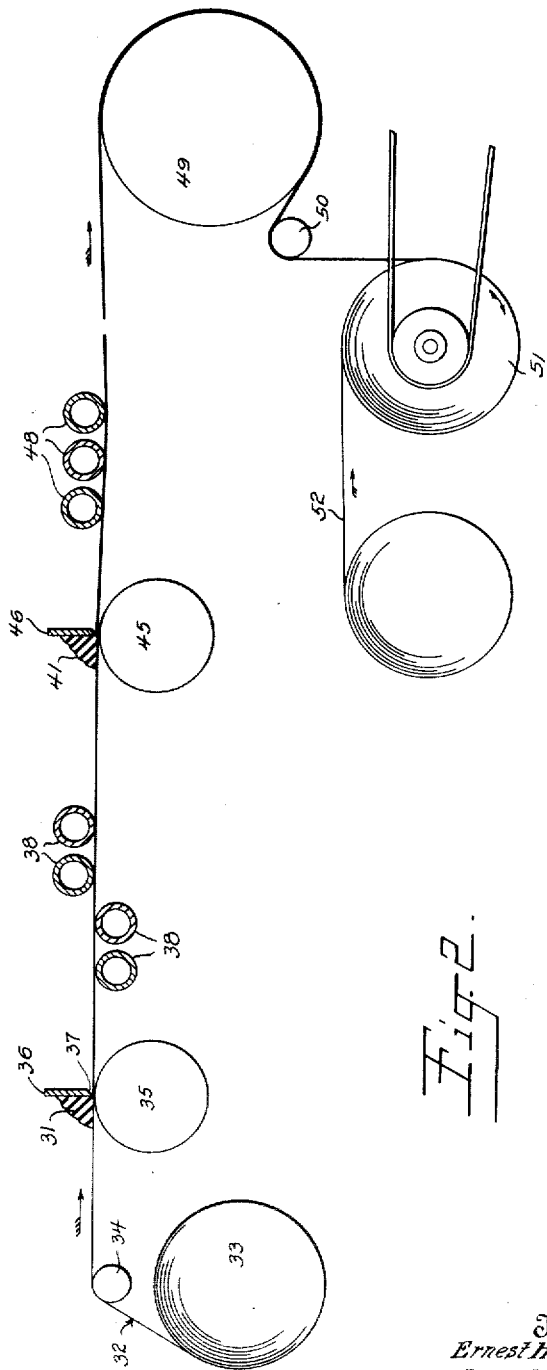

1,512,095

UNITED STATES PATENT OFFICE.

ERNEST HOPKINSON, OF NEW YORK, N. Y., AND KENNETH B. COOK, OF EAST ORANGE, NEW JERSEY, ASSIGNORS TO MORGAN & WRIGHT, OF DETROIT, MICHIGAN, A CORPORATION OF MICHIGAN.

METHOD AND APPARATUS FOR RUBBERIZING FILAMENTARY MATERIAL.

Application filed January 29, 1923. Serial No. 615,683.

*To all whom it may concern:*

Be it known that we, ERNEST HOPKINSON and KENNETH B. COOK, both citizens of the United States, residing at New York city, county and State of New York, and East Orange, county of Essex, and State of New Jersey, respectively, have invented a certain new and useful Method and Apparatus for Rubberizing Filamentary Material, of which the following is a full, clear, and exact description.

This invention provides a new and improved process for rubberizing filamentary material in general, such as weftless fabric, or single or double textures. It also provides an inexpensive apparatus for practicing the process, one which requires little floor space and few operators. Both process and apparatus are economical. Primarily, it is concerned with the direct utilization of rubber in its natural or virile state, unaffected by deleterious treatment as in coagulated rubber that has been broken down or "solutioned," or both.

With the illustrated embodiments in mind, but without intention to limit more than is required by the prior art, the invention, briefly stated, consists in applying more or less liquid rubber (preferably rubber latex) to moving filamentary elements, brushing the treated material on one or both faces, and preferably successively, with fast moving warm rolls to form a deposit of rubber in situ on the filamentary material and, in the manufacture of weftless fabric, at least, to join the filamentary elements with intervening webs of rubber.

Embodiments of the invention are illustrated diagrammatically in the accompanying drawings in which :—

Fig. 1 illustrates in side elevation, partly in section, an apparatus particularly suitable for manufacturing weftless fabric but also for rubberizing filamentary material in general.

And Fig. 2 illustrates in side elevation a "series" arrangement of treating and drying appliances particularly suited for "spreading."

Referring for the present to Fig. 1 of the drawings and having in mind the production of weftless fabric, a series of cord-holding spools 1, therein are shown arranged on a frame or creel 2, from which the cords are conducted to a threadboard 3, guides 4, lease-rods 5, bars 6, comb 7, and guide roll 8, to a treating station, preferably in the form of a tank 9 containing latex 10. Preferably, but not necessarily, a roll 11 with a corrugated rubber face is revolvably supported in the tank 9. The cords—in parallel relation, spaced a pre-determined distance between their centers and preferably contiguous, or nearly so, but they may be separated any desired extent—are conducted about the roll 11 through the latex, or between squeeze rolls (not shown) in the latex. From the latex tank, the cords pass alternately on opposite sides of a rod 12, to another comb 13. Then, they are drawn across bars or doctor blades 14 and 15, which preferably engage opposite sides of the sheet of treated cords and remove therefrom any excess of latex.

The thus-treated cords have now to be dried more or less completely. According to the present invention, they are brushed by rapidly moving metallic surfaces, preferably in the form of hollow rolls 16, 17, 18 and 19, made of brass, but any other suitable material capable of being finished with a smooth surface may be employed. These rolls are cylindrical and of a width sufficient to accommodate the material being rubberized. They are preferably rotated in the direction of travel of the material, as indicated by the arrows, and at a high speed, by a train of intermeshing gears 20 which may be driven in any suitable manner, as by the belt 21 connected with a motor 22. But, of course, any suitable means may be used to rotate the rolls. Advantageously, the rolls are located in staggered relation alternately on opposite sides of the sheet of cords, and are proportioned and disposed so as to compel the cords to take a slightly tortuous or undulated path in passing between them, thereby having a somewhat restricted area of contact with the material. For maintaining the rolls at a suitable elevated temperature, lines of piping 23 may be coupled therewith axially to place their interiors in communication with a source of supply of steam, electricity, or other heating medium. From the rolls 16—19, the cords are preferably led around a drum or can 24, which is rotated at a suitable speed and which is preferably, but not necessarily, heated in any convenient manner, as through the steam line 25, in communication with its interior. Between the dry can 24 and the last of the ironing rolls 19, preferably but not necessarily also, is interposed a bar 26, which deflects the cords slightly from a straight path and maintains enough tension on them to insure against rupture of the joining webs of rubber (particularly marginally of the sheet) that are ordinarily formed by the time the cords pass the last ironing roll.

The cords are looped more or less extensively around the dry can 24 to insure their uniform progress or rate of travel through the apparatus, the arc of engagement being governed by suitably locating an idler roll 27 relative to the drying can.

While the sheet of cords may be fed through the apparatus by the dry can 24 alone, it is preferable to supplement the action of the same with rubber-faced feed rolls 28, through which the sheet of cords is looped and passed on to a wind-up reel 29, suitably arranged to coil the rubberized material up with a liner 30 interposed between convolutions, in an old and well-known manner, for facility in subsequent manipulation.

Another type of apparatus, more particularly suited for "spreading" a doughlike mass 31 of rubber, such as latex butter (i. e., concentrated latex containing 50% more or less of rubber of a somewhat pasty consistency) is illustrated in Fig. 2 of the drawings, which will now be described with the treating of a woven fabric 32 in mind. The fabric from a roll 33 is conducted over an idler 34 to a rotating drum 35, above which is supported a doctor blade 36, with its lower or levelling edge 37 a suitable distance from the rotating drum 35. The rubber mass 31, maintained in advance of this doctor blade, is drawn by the fabric 32 under the doctor blade and levelled off or "spread" in a layer or coat of a predetermined thickness. The coated fabric then passes on to a series of ironing rolls 38, similar to those already described in detail, which may be variously arranged (as shown, for instance) to substantially dry the latex that has been applied to the fabric. These ironing rolls may be driven in any convenient manner at a suitable speed and direction, and may be heated more or less to meet the requirements of the rubber and fabric or material being treated.

In "spreading," as heretofore practiced with solutioned rubber, it has been customary to repeat the operations many times, building up film after film to obtain the required plied thickness of rubber. With the rapidly revolving ironing rolls of the present invention, it is possible to materially reduce the number of these operations, but for most purposes it is deemed preferable to apply at least two coats of the latex butter. To this end, "in series" with the previously described apparatus, the coated fabric 32 may be passed between a second doctor blade 46 and cooperating drum 45, and subsequently burnished or ironed with another battery of rolls 48, to "spread" a second coat of latex butter from a mass 41 thereof. Of course, other coats of rubber may be similarly and successively built up on the fabric. One or more additional applying and drying means arranged in series for successive operation are, therefore, to be understood as comprehended within the invention, the number being variable to meet the requirements of the product sought and the permissible cost of its manufacture.

Any suitable feeding means may be provided to draw the fabric through the "spreading" apparatus, such, for instance, as the drum 49, which may be heated or not as required, and about which the material is looped to an extent pre-determined by the location of an idler roll 50, as in the construction illustrated in Fig. 1. The product may be continuously removed by a belt driven wind-up, or reel, 51, with or without a liner 52, interposed between convolutions of the product, as heretofore.

The two types of apparatus, shown diagrammatically in Figs. 1 and 2, illustrate the breadth of the invention, and that it is not intended to be confined in its broad scope to the rubberizing of any particular material; all uses being comprehended which involve the principle of ironing more or less completely dry, with the apparatus shown or equivalents thereof.

Weftless fabric, such as is particularly valuable for the manufacture of tire casings and consists of parallel unwoven cords in contiguity or in proximity to one another, may be readily manufactured with the apparatus diagrammatically shown in Fig. 1, without, as heretofore, superimposing the treated cords on a conveyor or fabric strip in order to remove water from the latex and leave a deposit of rubber in or on, and joining the cords. And not as great length of material between the source of supply and the wind-up reel is required to be handled as before.

The rate of production may be varied by suitably altering the speed of the ironing rolls and their heat, or by increasing or decreasing the number of ironing rolls employed, or by heating the dry can, if used,—the rate of travel of the filamentary material through the apparatus being dependent upon many factors, such as—(1) the rubber content of the latex, (2) and (3) the peripheral speed and temperature of the ironing rolls, (4) the weight of the filamentary material, and (5) the presence or absence of a heated dry can. Recognizing this, however, the following data for the production of weftless fabric by an apparatus, such as that illustrated in Fig. 1, is given for the guidance of those skilled in the art. Cords of the size or weight commonly employed in manufacturing pneumatic tire casings at the present day (such as 26—5—3) have been conducted from a creel through latex containing approximately 26% of rubber at a speed of 1½ yards per minute, and substantially dried by brass ironing rolls, 3½″ in diameter, at an average temperature of a little over 150° F., revolving at 500 R. P. M., the cords leaving the last ironing roll being held together by joining webs of rubber, more or less dry, formed between them at this stage. Further, and more nearly complete, drying was effected by a dry can, such as at 24, supplied with steam at 10 lbs., to yield a temperature on the surface of the can around 190° F., but the can need not be heated. While the same amount of heat was supplied to each roll, the surface temperature of the first one engaging the treated material approximated 140° F., the second 145° F., the third 150° F., and the last one 165° F. It was found advantageous, but not imperative, to employ a stationary bar or deflector 26 between the last ironing roll and the dry can to maintain a slight tension on the cords in order to insure against rupture of the joining webs of rubber between them, especially marginally of the sheet. It is to be understood that the above figures are merely illustrative of the conditions obtaining or desirable for the manufacture of the particular product specified and are not intended to be limiting.

In manufacturing weftless fabric, it was noticed that the ironing rolls, at least when arranged on opposite sides of the sheet of cords, seemed to work the latex from one face to the other of the material. A relatively wide film of latex extending toward the tank 9 appeared opposite the roll 16, smaller films appeared opposite the rolls 17 and 18, and practically no film was visible opposite the last roll 19, indicating that substantial dryness or removal of most of the water from the latex had occurred before the material completely passed the battery of ironing rolls. Very thin liquid films appear to be drawn out by the ironing rolls and exposed almost a whole revolution for ready evaporation into the atmosphere by the gentle heat maintained, preferably, in the ironing rolls. With latex containing 36% rubber, the ironing rolls performed their function when barely warm (around 120° F.). The higher the rubber content of the latex, inferentially the less heat required, apparently, in the ironing rolls, other conditions remaining the same. This last-mentioned factor is believed to particularly adapt the apparatus for "spreading". But in this connection, note is again made to the fact that the weight of the fabric, or filamentary material or elements, is another factor in the operation.

In this application and in the claims, the term "latex" is employed to comprehend the milky juice, or fluid, obtained from rubber, balata, gutta percha, and other plants, which yield, on coagulating or water-separating treatment of one sort or another, a material having the properties of rubber or similar properties adapting them to rubber manufacture or analogous manufacturing purposes, and whether the rubber content be as obtained naturally, or higher or lower, and also whether compounding ingredients, including vulcanizing agents, be intermingled in the latex or not. By "rubberizing" is meant coating with rubber or rubber composition derived from a more or less liquid mass thereof susceptible of application and ironing in the manner disclosed. In the claims, the terms "filamentary material" and "filamentary elements" are employed to comprehend fibrous or textile material used in the manufacture of rubber goods (generally consisting of cotton) in the form of rovings, yarns, threads, cords, and the like, whether unconnected, or connected in any manner whatever, as by weaving, knitting, or otherwise fabricating, in a form susceptible of "ironing" treatment to deposit rubber, as disclosed. By the term "ironing" in connection with the process is meant the subjection of the material to the brushing or wiping action of rolls, the peripheral velocity of whose surfaces is many times the linear velocity or rate of travel of the material, the difference in their velocities being variable, as already indicated, to suit the several variable factors in the process.

The invention is not intended to be limited to details hereinbefore disclosed, alternatives, such as blowing heated air or gas over the ironing rolls instead of heating them internally, or varying the number or direction of rotation of the ironing rolls, being comprehended. Rotation of the ironing rolls in a direction contrary to the fabric requires the expenditure of more power to draw the material through the apparatus. For some purposes, pairs of the rolls may be arranged to revolve so as to neutralize each other, that is, one to tend to pull the material forward as much as the other retards it. Of course, more than one dry can may be employed in conjunction with the ironing rolls, it being within the broad invention to use the latter for either partly or substantially completely drying the rubber-treated material. Reference should therefore be made to the accompanying claims for an understanding of the scope of the invention.

Having thus described our invention, what we claim and desire to protect by Letters Patent is:—

1. That method of rubberizing filamentary material which consists in, treating the filamentary elements with a rubber-containing liquid and ironing them substantially dry.

2. That method of rubberizing filamentary material which consists in, treating the filamentary elements with latex and simultaneously ironing a plurality of them to deposit rubber in situ thereon.

3. That method of rubberizing filamentary material which consists in, treating the filamentary elements with latex, paralleling the elements in proximity, and ironing the treated elements substantially dry to thereby join them together in such parallel relation with webs of rubber derived from the latex.

4. That method of rubberizing filamentary material which consists in, treating the filamentary elements with latex, paralleling the elements in proximity, successively ironing the treated elements substantially dry, and subsequently more completely drying the elements.

5. That method of rubberizing filamentary material which consists in, treating the filamentary elements with latex, paralleling the elements in proximity, successively ironing the treated elements substantially dry, subsequently more completely drying the elements, and tensioning the elements against lateral separation while drying them.

6. That method of rubberizing filamentary material which consists in, treating the filamentary elements with latex, and ironing opposite sides of the filamentary elements at intervals to deposit rubber in situ thereon.

7. An apparatus for rubberizing filamentary material, comprising in combination, a supply of filamentary material, means for applying latex to the filamentary material, metallic means for ironing the filamentary material, means for moving the metallic ironing means rapidly relative to the filamentary material, and means for feeding the fibrous material through the apparatus.

8. An apparatus for rubberizing filamentary material, comprising in combination, a supply thereof, means for applying latex to the filamentary elements, means for moving the filamentary elements, a plurality of ironing rolls arranged to engage the filamentary elements at intervals, means for revolving the rolls rapidly relative the moving filamentary elements, and means for heating the rolls.

9. An apparatus for rubberizing filamentary material, comprising in combination, a supply of filamentary elements, means for applying latex to the filamentary elements, means for moving the filamentary elements, a plurality of spaced-apart ironing rolls arranged to engage opposite sides of the filamentary elements, and means for moving the rolls more rapidly than the filamentary elements.

10. An apparatus for rubberizing filamentary material, comprising in combination, a source of supply of filamentary elements, means for applying latex to the filamentary elements, means for moving the filamentary elements, a plurality of ironing rolls arranged to engage the filamentary elements at intervals, and means for moving the rolls more rapidly than the filamentary elements and, at the restricted area of contact of the rolls therewith, in the same direction as the filamentary elements.

11. An apparatus for rubberizing filamentary material, comprising in combination, a source of supply of filamentary elements, means for applying latex to the filamentary elements, means for moving the filamentary elements, a plurality of rolls arranged to engage the filamentary elements at intervals, means for revolving the rolls rapidly relative to the filamentary elements and, at the area of contact of the rolls with the filamentary elements, in the same direction as the filamentary elments, and means for maintaining the rolls at an elevated temperature.

12. In an apparatus for more or less completely drying rubberized cords, woven or unwoven, a series of smooth surfaced ironing rolls adapted to engage the cords at intervals, and means for revolving the rolls rapidly relative to the cords.

13. In an apparatus for more or less completely drying rubberized cords, woven or unwoven, a series of brass ironing rolls adapted to engage the cords at intervals, and means for revolving the rolls rapidly relative to the cords.

14. In an apparatus for more or less completely drying rubberized cords, woven or unwoven, a series of smooth surfaced ironing rolls adapted to engage the cords at intervals, and means for revolving the rolls rapidly relative to the cords and in the same direction as the cords where they contact therewith.

15. An apparatus for rubberizing filamentary material, comprising in combination, a source of supply of filamentary elements, means for treating them with latex, means for drawing the filamentary elements through the apparatus including a revolving drum about which the treated filamentary elements are partially encircled to insure their uniform advance, and metallic means intermediate said drum and latex treating means for brushing the filamentary elements and depositing rubber in situ thereon.

16. An apparatus for rubberizing filamentary material, comprising in combination, a source of supply of filamentary elements, means for treating them with latex, means for drawing the filamentary elements through the apparatus including a revolving drum about which the treated filamentary elements are partially encircled to insure their uniform advance, metallic means intermediate said drum and latex treating means for brushing the filamentary elements and depositing rubber in situ thereon, and means intermediate said metallic means and said drum preventing the filamentary elements from separating to insure the formation of joining webs of rubber between the filamentary elements.

17. An apparatus for rubberizing filamentary material, comprising in combination, a source of supply of filamentary elements, means for treating them with latex, means for drawing the filamentary elements through the apparatus including a drum revolving at the rate of movement of the filamentary elements, a series of ironing rolls intermediate the drum and latex treating means, and a stationary bar deflecting the filamentary elements from a straight path between the drum and the ironing roll engaging the filamentary elements immediately before the drum.

18. An apparatus for rubberizing filamentary material, comprising in combination, a supply of filamentary elements, means for applying latex to the filamentary elements, means for moving the filamentary elements, a plurality of spaced-apart ironing rolls arranged to engage opposite sides of the filamentary elements, means for moving the rolls more rapidly than the filamentary elements, and additional means for further drying the filamentary elements after they leave the ironing rolls.

Signed at New York city, county and State of New York, this 26 day of January, 1923.

ERNEST HOPKINSON.
KENNETH B. COOK.

Certificate of Correction.

It is hereby certified that Letters Patent No. 1,512,095, granted October 21, 1924, upon the application of Ernest Hopkinson, of New York, N. Y., and Kenneth B. Cook, of East Orange, New Jersey, for an improvement in " Methods and Apparatus for Rubberizing Filamentary Material," were erroneously issued to " Morgan & Wright, of Detroit, Michigan," as assignee of the entire interest in said invention, whereas said Letters Patent should have been issued to the inventor, said *Hopkinson*, and *Morgan & Wright, of Detroit, Michigan, a Corporation of Michigan*, said corporation being assignee of the one-half interest of Kenneth B. Cook, as shown by the records of assignments in this office; and that the said Letters Patent should be read with this correction therein that the same may conform to the record of the case in the Patent Office.

Signed and sealed this 18th day of August, A. D. 1925.

[SEAL.]
KARL FENNING,
*Acting Commissioner of Patents.*